Sept. 29, 1942.　　　　E. BRULIN　　　　2,297,534
DISTANCE MEASURING DEVICE
Filed Aug. 13, 1941　　　2 Sheets-Sheet 1
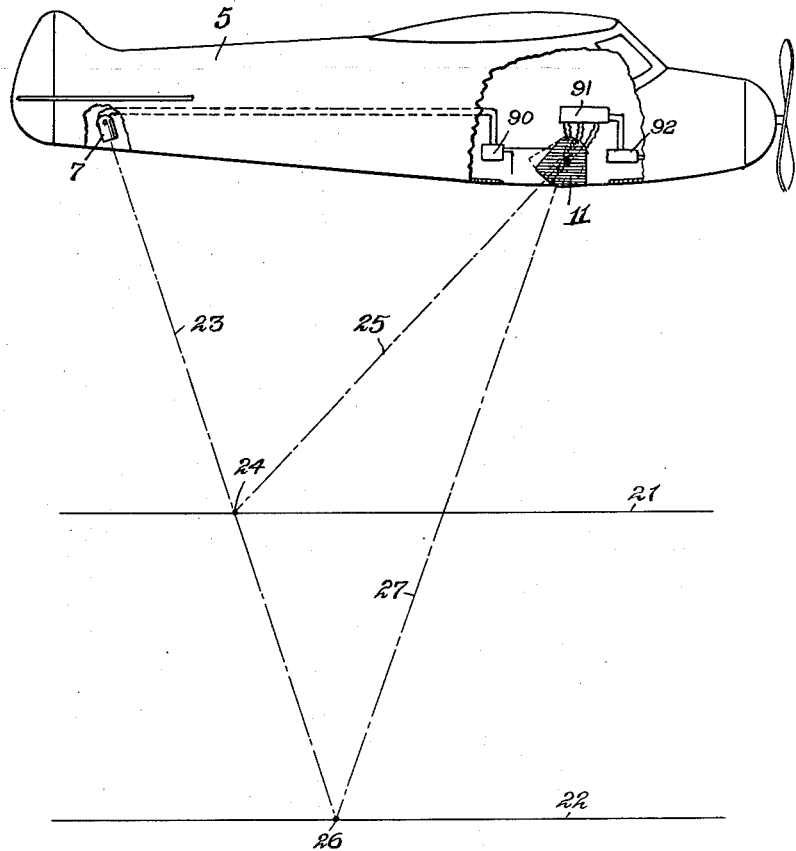
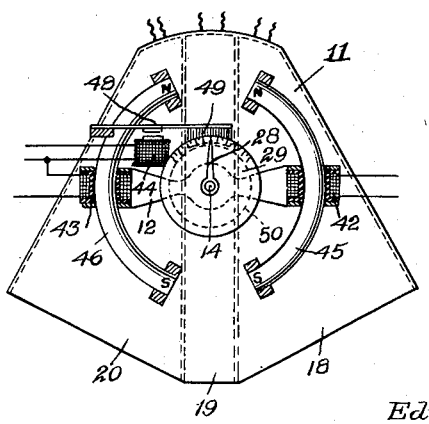
INVENTOR
Edvard Brulin Sept. 29, 1942.          E. BRULIN          2,297,534
DISTANCE MEASURING DEVICE
Filed Aug. 13, 1941          2 Sheets-Sheet 2
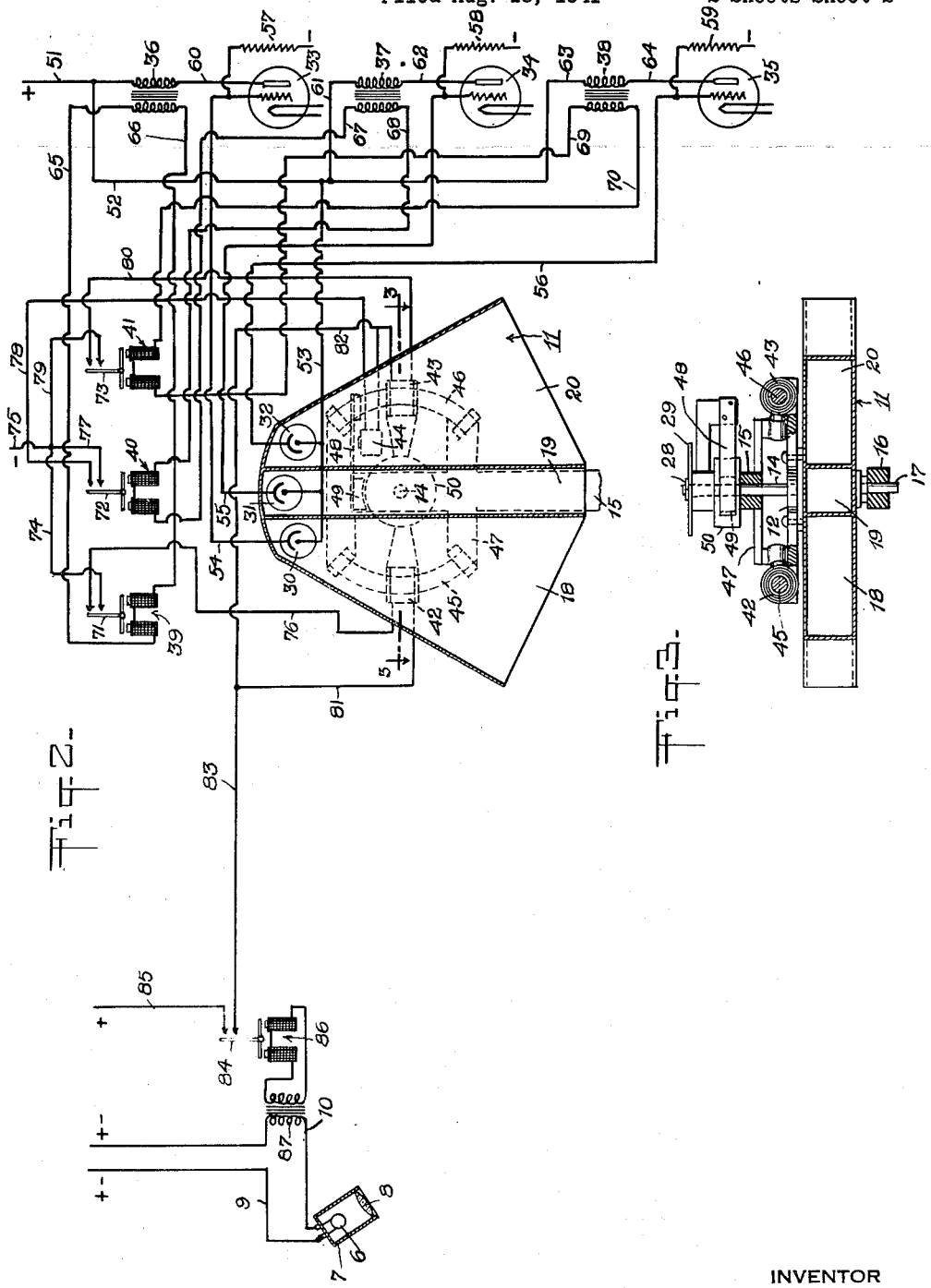
INVENTOR
*Edvard Brulin*
BY
ATTORNEYS
WITNESSES Patented Sept. 29, 1942

2,297,534

UNITED STATES PATENT OFFICE 2,297,534

DISTANCE MEASURING DEVICE

Edvard Brulin, Brooklyn, N. Y., assignor of one-half to Olson Bros. Machine, Tool and Saw Co., Inc., Brooklyn, N. Y., a corporation of New York Application August 13, 1941, Serial No. 406,669

3 Claims. (Cl. 250—1)

This invention relates to a measuring device for measuring the distance between two objects.

Although my device may have many different uses, it is particularly adapted for use on an aircraft to measure the distance or altitude of the aircraft above the ground. Many of the altimeters now in use indicate the altitude of the aircraft above sea level. However, as a practical matter, it is more important for the pilot to be apprised of the distance of the aircraft above the ground.

It is an object of the present invention to provide an improved automatically operable device for instantaneously indicating the distance of the aircraft above the ground, and which will immediately respond to any variation in distance and indicate the new or corrected distance.

A further object is the provision of improved apparatus of the above character using a reflected beam coming from a source of energy, directed at a known angle whereby the distance of the aircraft or other object from the reflecting surface can be calculated by the angle at which the beam impinges upon the aircraft.

A further object is the provision of an improved distance measuring device using a beam of spectral energy which will operate during fogs and adverse weather conditions, and which will only respond to a beam of the type coming from the controlled source of energy and will not respond to other types of beams.

A further object is the provision of a distance or altitude indicating device of simplified construction and having relatively few moving mechanical parts whereby the device may be used for relatively long periods of time with comparative freedom from wear.

In the accompanying drawings—

Fig. 1 is a side elevation partially fragmentary, showing an altitude or distance indicating device embodying my invention, applied to an airplane;

Fig. 2 is a circuit diagram of the circuits which may be employed in connection with my device and showing the source of light or other spectral energy and the receiving device in section;

Fig. 3 is a cross sectional view of the beam receiving device and associated parts in the direction of the arrows on the line 3—3 of Fig. 2; and Fig. 4 is an elevational view from one side of the receiving device.

My invention is particularly applicable to aircraft for indicating the distance or altitude of the aircraft above the ground, although it may also be used for measuring the distance between other objects.

In the drawings I have indicated my device as applied to an airplane 5, of conventional construction, and which, per se, does not constitute my invention. On the airplane I mount both a source of light or other spectral energy, and a receiving device for receiving the reflected rays of the beam of light or spectral energy.

The light source may take the form of a lamp 6, mounted in a casing 7, provided with a lens 8 at the lower end thereof. The casing 7 is mounted in the plane at a controlled predetermined angle so as to direct the beam of light or spectral energy downwardly towards the ground at an angle approximating the angle shown in Fig. 1. The lamp is preferably an infra-red ray lamp so that its beam will penetrate fogs and the like and it is connected by a lead 9 to one side of a source of electric current, and by lead 10 to the other side of the source of electric current.

The electric current employed for the lamp 6 is preferably alternating current, of a known frequency as, for instance, thirty cycles per second. By using alternating current of this character, and by using the additional light receiving mechanism hereinafter described, my distance measuring device will only respond to light coming from the lamp 6 and will not respond to a light having a different frequency.

The light source is preferably mounted near one end of the plane as, for instance, the tail of the plane, and pivotally mounted adjacent the opposite end of the plane is a light receiving device for receiving rays of light reflected from the ground. The light receiving device comprises a hood 11, supported on one side by a yoke 12, connected to shaft 14 journaled in fixed bracket 15. On its opposite side, the hood is provided with a bearing 16 which engages and may rotate about the shaft 17. It will thus be seen that hood 11, yoke 12, and shaft 14 may pivot or rotate around a horizontal axis passing through the shafts 14 and 17.

The hood is divided into three compartments, 18, 19 and 20, the central compartment 19 being elongated and relatively narrow, and the outer compartments 18 and 20, preferably flaring outwardly in the manner shown. The hood is so mounted on the airplane as to pivot towards and away from the light source. Since, in the illustrated embodiment, the light source is mounted in the tail of the ship and the hood is mounted near the front of the fuselage, the hood will pivot longitudinally of the ship. The hood should be of such a size and the light source should be directed at such an angle that rays of light, reflected from the spot of light formed by the beam on the ground, will enter one of the compartments of the hood, regardless of the altitude of the plane. This is illustrated in Fig. 1, in which the line 21 represents the ground level when the plane is flying comparatively low, and the line 22 represents the ground level when the plane is flying at a relatively greater altitude. The light beam 23, coming from the light source, impinges upon the lower ground level 21 at the point or spot 24 and a ray is reflected upwardly along the line 25 to the hood. The beam 23 impinges upon the higher ground level at the point or spot 26, and a ray of light is reflected along the line 27 to the hood.

In both instances, when the hood 11 is depending downwardly in its normal vertical position, shown in Figs. 2 and 4, the rays 25 and 27 reflect into the first compartment 18. When the spot of light is positioned immediately beneath the central portion of the hood, it will reflect upwardly into the compartment 19, when the hood is in its normal position. When the altitude of the airplane is further increased so that the spot of light is positioned in front of the hood, a ray of light will reflect upwardly into the compartment 20, when the hood is depending downwardly in its normal position.

In association with the hood 11, I provide improved mechanism whereby the central portion of the hood is always caused to point towards the spot of light on the ground, when the device is in operation, and since the light source is adjusted to a fixed angle, the angle of the hood will always accurately indicate the distance or altitude of the aircraft in normal horizontal position above the ground. In this connection, I preferably provide a suitable indicating dial, such as the pointer 28, fixedly mounted on the shaft 14 so as to rotate therewith, and a fixed dial face 29, having altitude markings formed thereon and positioned adjacent the pointer 28. The dial face is attached to the fixed bracket 15, and in this way it will be seen that, as the angle of hood 11 varies, the angle of pointer 28, with respect to the dial face, will similarly vary so as to indicate the altitude or distance of the plane above the ground.

The mechanism whereby the hood is caused to automatically point towards the spot of light on the ground, coming from the light beam 23, comprises the photo-electric cells 30, 31 and 32, positioned adjacent the upper edges of compartments 18, 19 and 20, and connected in the grid circuits of the amplifier tubes 33, 34 and 35 which, in turn, are inductively coupled as by the transformers 36, 37 and 38, to the circuits of the relays 39, 40 and 41. Relay 39 controls the circuit of coil 42. Relay 41 controls the circuit of coil 43, and relay 40 controls the circuit of solenoid 44.

The coils 42 and 43 are disposed around the permanent magnets 45 and 46, respectively, which are fixedly mounted on the yokes 47 and are in the form of arcs drawn from a center conforming with the axis of rotation of hood 11. The permanent magnets have fixed poles which, in the illustrated embodiment, are arranged with the north poles toward the top, and the south poles towards the bottom. When coils 42 and 43 are energized, they are attracted towards the north poles of the respective magnets. In this connection it will be appreciated that coils 42 and 43 are of the type which have two south poles, i. e., one at each end, and a north pole at the central portion. To accomplish this, the winding at one end of each coil is in a clockwise direction, and at the other end in a counterclockwise direction.

In Figs. 1 and 2, coils 42 and 43 are mounted upon yoke 12 which rotates or pivots with hood 11. Thus, when coil 42 is energized, the entire hood is caused to rotate or pivot in a clockwise direction, as viewed in Figs. 1 and 2. When coil 43 is energized, the entire hood is caused to rotate or pivot in a counter-clockwise direction, as viewed in these figures. Solenoid 44 is provided with an armature 48 having a brake block 49 secured to the end thereof and adapted to engage a brake drum 50 on shaft 14 and prevent further rotation thereof when the solenoid is energized and attracts the armature towards it. Due to this arrangement, it will be seen that when the light beam 23 impinges upon the ground so as to form a spot to the rear of hood 11, as shown at 24 and 26 in Fig. 1, a ray of light from the spot will reflect against the photo-electric cell 30 in compartment 18, and through the medium of amplifier tube 33 and relay 39, will energize coil 42, causing the hood to pivot in a clockwise direction, as viewed in Figs. 1 and 2. When the center compartment 19 faces towards the spot of light so that a ray of light is directed upon the photo-electric cell 31, solenoid 44 will be energized, with the result that brake 49 will be applied, locking the hood in a position directed towards the spot of light.

Since the lamp 6 and casing 7 are disposed at a predetermined angle, and the markings on dial plate 29 have been properly calibrated in accordance with that angle, dial 28 will accurately indicate the altitude of the airplane. It will be appreciated that when the spot of light is formed in front of the hood, a ray of light will reflect upon photo-electric cell 32, with the result that the hood will be caused to pivot in a counter-clockwise direction, as viewed in Figs. 1 and 2, until the center compartment 19 is directed towards the spot, at which time a light ray will impinge upon photo-electric cell 31, causing the operation of the brake. When the elevation of the plane above the ground varies, due to irregularities on the surface of the ground, or for any other reason, the hood will automatically vary its position so that the center compartment thereof points towards the spot. Accordingly, my improved device will always accurately register the height of the airplane above the ground.

A wiring diagram whereby the desired results can be obtained is shown in Fig. 2, wherein it will be seen that the photoelectric cells are connected in so-called "forward circuits" with the amplifier tubes. Thus, at one side, the photo-electric cells are connected by leads 51, 52 and 53, to the positive side of a source of electric current. Photo-electric cell 30 is connected by lead 54 to the grid of tube 33, while photo-electric cell 31 is connected by lead 55 to the grid of tube 34, and photo-electric cell 32 is connected by lead 56 to the grid of tube 35. The filament of each tube is connected directly to the negative side of the source of electric current, while the grids of the tubes are connected through resistances 57, 58 and 59 respectively, to the negative side of the source of electric current.

One end of the primary winding of transformer 36 is connected by lead 51 to the positive side, while the other end of the winding is connected by lead 60 to the plate or tube 33. One end of the primary winding of transformer 37 is connected by leads 51, 52 and 61 to the positive side of the source of electric current, while the other end of the winding is connected by lead 62 to the plate or tube 34. Similarly, one end of the primary winding of transformer 38 is connected by leads 51, 52 and 63 to the positive side of the source of electric current, and the other end of the winding is connected by lead 64 to the plate or tube 35.

The secondary winding of transformer 36 is connected by leads 65 and 66 to the two ends of the winding of relay 39, and the secondary winding of transformer 37 is connected by leads 67 and 68 to the two ends of the winding of relay 40, while the secondary winding of transformer 38 is connected by leads 69 and 70 to the two ends of the winding of relay 41.

Relays 39, 40 and 41 control the operation of switches 71, 72 and 73 which are disposed in the circuits of the coils 42 and 43 and the solenoid 44. Thus, it will be seen that one of the terminals of switch 71 is connected by leads 74 and 75 to the negative side of a source of electric current, while the other terminal of switch 71 is connected by lead 76 to one end of the winding of coil 42. Similarly, one terminal of switch 72 is connected by leads 77 and 75 to the negative side of a source of electric current, while the other terminal is connected by lead 78 to one end of the winding of solenoid 44. One terminal of switch 73 is connected by leads 79 and 75 to the negative side of the source of electric current, and the other terminal is connected by lead 80 to one end of the winding of coil 43. The circuits of the coils 42 and 43 and of solenoid 44 are completed through leads 81, 82 and 83, switch 84 and lead 85, which connects to the positive side of the source of electric current. Switch 84 is controlled by relay 86.

From the circuits just described, it will be seen that when switch 84 is closed so as to complete the connection between the coils 42 and 43 and solenoid 44, and the positive side of the source of electric current, the operation of relay 39 to close switch 71 will complete the circuit of coil 42. Similarly, the operation of relay 40 to close switch 72 will complete the circuit of solenoid 44, and the operation of relay 41 to close switch 73 will complete the circuit of coil 43.

In the illustrated embodiment of my invention, I have shown an arrangement whereby the receiving device will respond only to light beams similar to those emanating from lamp 6. This is accomplished by employing alternating current to energize the lamp 6. The alternating current has a predetermined number of cycles per second as, for instance, thirty, with the result that the beam from the lamp will oscillate or flicker a predetermined number of times. Relay 86 is disposed in the circuit of the secondary winding of transformer 87 which is connected in series with the lamp 6. The relay is a polarized relay, with the result that switch 84 is caused to open and close the same number of times as the lamp is caused to oscillate.

Similarly, relays 39, 40 and 41 are polarized relays in which the switches are caused to open or close, depending upon the direction of current flow through the windings of the relays. When alternating current flows through any one of the relays 39, 40 and 41, the switches 71, 72 and 73 will be caused to alternately open and close. When any one of these switches operate in synchronism with switch 84, it will be seen that the circuit of coil 42 or of coil 43 or of solenoid 44 will be intermittently energized. If the operation of relays 39, 40 and 41 are not in synchronism with relay 86, the coils 42 and 43 and solenoid 44 will not be energized. Thus it will be seen that when one of the photo-electric cells 30 is focussed upon a ray of light reflected from the light beam coming from lamp 6, it will create electrical impulses corresponding to the number of cycles of the alternating current employed, and due to the inductive coupling between the amplifier and the relays 39, 40 and 41, these relays will be energized by alternating current in synchronism with the alternating current operating the lamp.

Should a constant light beam become focussed upon one of the photo-electric cells, the relays 39, 40 and 41 will not be energized, due to the inductive coupling between the amplifiers and relays. Also, if a light beam having a different number of cycles becomes focussed upon one of the photo-electric cells, it will not interfere with the device, due to the fact that the relays 39, 40 and 41 will not operate in synchronism with relay 86 to close the circuit of one of the coils 42 or 43 or solenoid 44.

It should be understood that the relays and amplifier tubes may be enclosed in suitable casings. Thus, the relay 86 may be enclosed in a casing 90. The relays 39, 40 and 41 may be enclosed in a casing 91, and the amplifier tubes may be enclosed in a casing 92.

It will thus be seen that I have provided an improved distance measuring device for measuring the distance between two objects, particularly for measuring the distance or altitude of an aircraft above the ground. The device is automatically operable so as to constantly indicate the distance of the aircraft above the ground, and has a minimum of moving parts so that it will not readily get out of order. It should be understood that the expressions "light," "light beam" and "beam" as used herein, refer not only to visible light, but also to other spectral energies such as infra-red rays. It should also be understood that modifications may be made in the illustrated and described embodiment of my invention without departing from the invention as set forth in the accompanying claims.

I claim:

1. A device for measuring the distance between two objects comprising a light beam source mounted on the first object for directing a light beam at a predetermined angle towards the second object to form a spot of light thereon, a light receiving hood pivotally mounted on the first object and having a plurality of compartments open at one end thereof and closed at the opposite end and adapted to receive a ray of light reflected from the spot on the second object, and means including photo-electric cells mounted adjacent the closed ends of the compartments respectively and electrically operated apparatus connected to the photo-electric cells and controlled thereby for causing the light receiving hood to pivot in different directions when a ray of light impinges upon different photo-electric cells whereby the light receiving hood is caused to assume a predetermined angle with respect to the spot of light on the second object.

2. A device for measuring the distance between two objects comprising a light beam source mounted on the first object for directing a light beam at a predetermined angle towards the second object to form a spot of light thereon, a light receiving hood pivotally mounted on the first object and divided longitudinally into three compartments open at one end and closed at the opposite end and adapted to receive a ray of light reflected from a spot on the second object, and means including photo-electric cells mounted adjacent the closed ends of the compartments respectively, electro-magnetic means controlled by the photo-electric cells on the two outside compartments for causing the light receiving hood to pivot when a light ray impinges upon the said photo-electric cells, and a brake controlled by the photo-electric cell in the intermediate compartment for preventing pivoting of the light receiving hood when a ray of light impinges upon the intermediate photo-electric cell whereby the light receiving hood is caused to assume a predetermined angle with respect to the spot of light on the second object.

3. In a device of the character described, a light beam source mounted on a first object for directing a light beam towards a second object and form a spot of light thereon, a circuit including a source of electric current for supplying an alternating current of predetermined frequency to said light beam source whereby the light beam operates at a predetermined frequency, light sensitive means mounted on the first object for receiving a ray of light reflected from the spot of light on the second object, electrically operated means controlled by the light sensitive means, and means for energizing the electrically operated means comprising a lead for connecting the electrically operated means to one pole of a source of electric current and controlled by the said circuit to be intermittently energized at a predetermined frequency, and a second lead for connecting the electrically operated means to a source of electric current and controlled by the light sensitive means.

EDVARD BRULIN.